(12) United States Patent
Tirosh et al.

(10) Patent No.: US 7,673,324 B2
(45) Date of Patent: Mar. 2, 2010

(54) METHOD AND SYSTEM FOR TRACKING AN OPERATING PERFORMED ON AN INFORMATION ASSET WITH METADATA ASSOCIATED THEREWITH

(75) Inventors: Oren Tirosh, Tel-Aviv (IL); Eran Werner, Ra'anana (IL); Ishay Green, Tel-Aviv (IL); Liad Agmon, Tel-Aviv (IL)

(73) Assignee: McAfee, Inc., Santa Clara, CA (US)

( * ) Notice: Subject to any disclaimer, the term of this patent is extended or adjusted under 35 U.S.C. 154(b) by 349 days.

(21) Appl. No.: 11/733,153

(22) Filed: Apr. 9, 2007

(65) Prior Publication Data
US 2007/0220061 A1    Sep. 20, 2007

Related U.S. Application Data

(63) Continuation of application No. PCT/IL2006/000706, filed on Jun. 19, 2006.

(60) Provisional application No. 60/692,260, filed on Jun. 21, 2005.

(51) Int. Cl.
G06F 21/24    (2006.01)
G06F 17/00    (2006.01)
H04L 29/06    (2006.01)
H04L 9/00     (2006.01)

(52) U.S. Cl. .................................. 726/1; 726/26
(58) Field of Classification Search ....................... None
See application file for complete search history.

(56) References Cited

U.S. PATENT DOCUMENTS

| | | | | |
|---|---|---|---|---|
| 5,862,325 A * | 1/1999 | Reed et al. | ................ | 709/201 |
| 6,088,717 A * | 7/2000 | Reed et al. | ................ | 709/201 |
| 6,092,194 A * | 7/2000 | Touboul | ................ | 726/24 |
| 6,154,844 A * | 11/2000 | Touboul et al. | ................ | 726/24 |
| 6,226,618 B1 * | 5/2001 | Downs et al. | ................ | 705/1 |
| 6,389,403 B1 * | 5/2002 | Dorak, Jr. | ................ | 705/52 |
| 6,480,944 B2 * | 11/2002 | Bradshaw et al. | ................ | 711/162 |
| 6,574,609 B1 * | 6/2003 | Downs et al. | ................ | 705/50 |
| 6,587,837 B1 * | 7/2003 | Spagna et al. | ................ | 705/26 |
| 6,732,111 B2 * | 5/2004 | Brodersen et al. | ................ | 707/101 |
| 6,981,005 B1 * | 12/2005 | Cabrera et al. | ................ | 707/203 |
| 7,107,520 B2 * | 9/2006 | Gargi | ................ | 715/210 |
| 7,142,225 B1 * | 11/2006 | Boler et al. | ................ | 345/619 |
| 7,239,328 B2 * | 7/2007 | Boler et al. | ................ | 345/619 |
| 7,353,299 B2 * | 4/2008 | Hattrup et al. | ................ | 710/30 |
| 7,356,622 B2 * | 4/2008 | Hattrup et al. | ................ | 710/33 |
| 7,469,257 B2 * | 12/2008 | Parlin et al. | ................ | 707/102 |
| 7,497,370 B2 * | 3/2009 | Allen et al. | ................ | 235/375 |
| 2004/0167921 A1 | 8/2004 | Carson et al. | ................ | 707/102 |
| 2005/0060537 A1 | 3/2005 | Stamos et al. | ................ | 713/156 |
| 2006/0117048 A1 * | 6/2006 | Thind et al. | ................ | 707/101 |
| 2006/0259468 A1 * | 11/2006 | Brooks et al. | ................ | 707/3 |

OTHER PUBLICATIONS

International Preliminary Report from PCT Application No. PCT/IL2006/000706 mailed Jan. 10, 2008.
Written Opinion from PCT Application No. PCT/IL2006/000706 mailed Jun. 6, 2007.

* cited by examiner

*Primary Examiner*—Christopher A Revak
(74) *Attorney, Agent, or Firm*—Zilka-Kotab, PC

(57) ABSTRACT

A system and method are provided for tracking an operation performed on an information asset. The information asset has metadata associated therewith. In use, the metadata is preserved during the at least one operation.

21 Claims, 9 Drawing Sheets

METHOD AND SYSTEM FOR TRACKING AN OPERATING PERFORMED ON AN INFORMATION ASSET WITH METADATA ASSOCIATED THEREWITH

RELATED APPLICATIONS

The present application is a continuation of a PCT application filed Jun. 19, 2006 under serial number PCT/IL2006/000706, which claims priority of a provisional application filed Jun. 21, 2005 under Ser. No. 60/692,260, which are each incorporated herein by reference.

FIELD OF THE INVENTION

The present invention generally refers to methods and systems for leakage protection, and more particularly to a method and system for providing comprehensive protection against leakage of sensitive information assets from the enterprise, using host based agents, content-meta-data and rules-based policies.

BACKGROUND OF THE INVENTION

Host-based Information Leakage Detection and Prevention Systems (HILDP) are closely related to Host-based Intrusion Prevention Systems (HIPS) and therefore both types of systems shall be considered as prior art. HIPS focus on detecting and preventing attempts by outsiders to gain unauthorized access to resources on the host or execution of malicious code. By contrast, HILDP systems focus on detecting and preventing the transmission of sensitive information from the host to unauthorized destinations outside the enterprise.

In spite of the difference in focus and terminology, these systems are similar in structure and use essentially the same technical means to achieve their goals: detection and/or prevention of host-based activities which may constitute a violation of the organization's security policy. In this context, HIPS and HILDP shall be considered as two specific cases of a common class. The qualifier "Host-based" indicates that activity is monitored within each network-connected computer (host), in contrast to Network-based IPS and ILDP systems which analyze the network traffic on a shared computer network.

Application software running on the host can directly access only the application's memory space. Access to any other resources such as file storage, network resources or attached physical devices is mediated by the operating system kernel or other system services. The application communicates with the operating system or system services via various Application Programming Interfaces (API), System calls, Inter Process Communication (IPC) or similar software interfaces. HIPS/HILDP systems use various means to intercept requests from the application software to the operating system kernel or system services. The software components performing this function are variously referred to as Sensors, Probes, Data-gathering components or other terminology and are tailored to the type of interface and type of requests they are designed to intercept.

Sensors gather information about application requests and encapsulate the request parameters and context into a data structure which will be referred to as an Event or Event Description. If the request is a data transmission request, the event may also include the actual content or summary of the transmitted information. Events are communicated from the Sensors to a software component known as an Agent.

An HILDP/HIPS agent must be able to correlate or aggregate multiple low-level events to a smaller number of high-level events, which may be more meaningful to the goals of the system. The agent then applies a Policy to the Events. A Policy is a collection of Rules. Each Rule consists of a Condition, sometimes referred to as a Template or Pattern, and a Reaction to be performed by the Agent when an Event matching the Condition is detected. It is worth noting that in order to distinguish events and potentially respond to them with different reactions, the agent must have the pertinent information available as part of the event description at the time of the event.

In the case of HIPS, such as anti-virus applications, the policy is established to control unauthorized access to the host. Typically, sensors will report external access attempts to the host as well as unusual local activity, which may be an indication that an intruder has already gained some access and is attempting to extend or use it. The agent will apply a set of reactions such as ignore (allow the operation to proceed), Block (cause the operation to fail) or Log (allow the operation to proceed but log its details).

An ILDP system may establish a policy to control the leakage of information from the organization by insiders. For example, the policy may specify which applications are allowed to access certain files, devices or network services in order to prevent an application from reading a file and then forward a copy of it over the network or to an external device. Again the possible Reactions may include Ignore (allow), Block or Log the attempted operation.

Occasionally, the information immediately available to the agent and encapsulated within an event upon a request may not be sufficient to make a proper decision. For example, when an attempt is made to send a file to an external email destination, the fact that the file has been copied several weeks earlier from a designated internal folder may be relevant to the decision, even though this information is not immediately available.

One approach to addressing this problem is to compare the content of the transmitted file against a global database of all sensitive documents in the organization. Such an approach is implemented by existing network based ILDP systems. However, this approach suffers from several problems. It requires a centralized database which is difficult to scale and is bound to produce many false positives. Furthermore, this database will not be available to hosts working offline, or outside the organization's network. Finally, this approach assumes that the content of the transmission is always accessible. Also, if the information asset is stored in an encrypted format this type of system will not be able to compare it against the global database.

Thus, it would be advantageous to provide a method that addresses the problems of comparing the content of the transmitted file against a global database of all sensitive documents and the problem of information assets stored in encrypted format.

Prior art includes Stamos et al, in US patent application 20050060537, which discloses a technique for establishing digital control over digital assets such as computer files. There is no content analysis. The system is gateway-based for e-mails. The system offers a way of tagging digital assets, but does not maintain the tagging through the life cycle of the information.

Carson et al. in US patent application 20040167921, teaches a technique for efficient representation of dependencies between electronically stored documents, such as an enterprise data processing system. The file history of the meta-data type of information is made available, but not by paragraphs. The application aims at controlling port and IP traffic.

SUMMARY OF THE INVENTION

A system and method are provided for tracking an operation performed on an information asset The information asset has metadata associated therewith. In use, the metadata is preserved during the at least one operation.

BRIEF DESCRIPTION OF THE DRAWINGS

In order to understand the invention and to see how it may be carried out in practice, a preferred embodiment will now be described, by way of a non-limiting example only, with reference to the accompanying drawings, in which.

DETAILED DESCRIPTION OF AN EXEMPLARY EMBODIMENT

Figure 1:
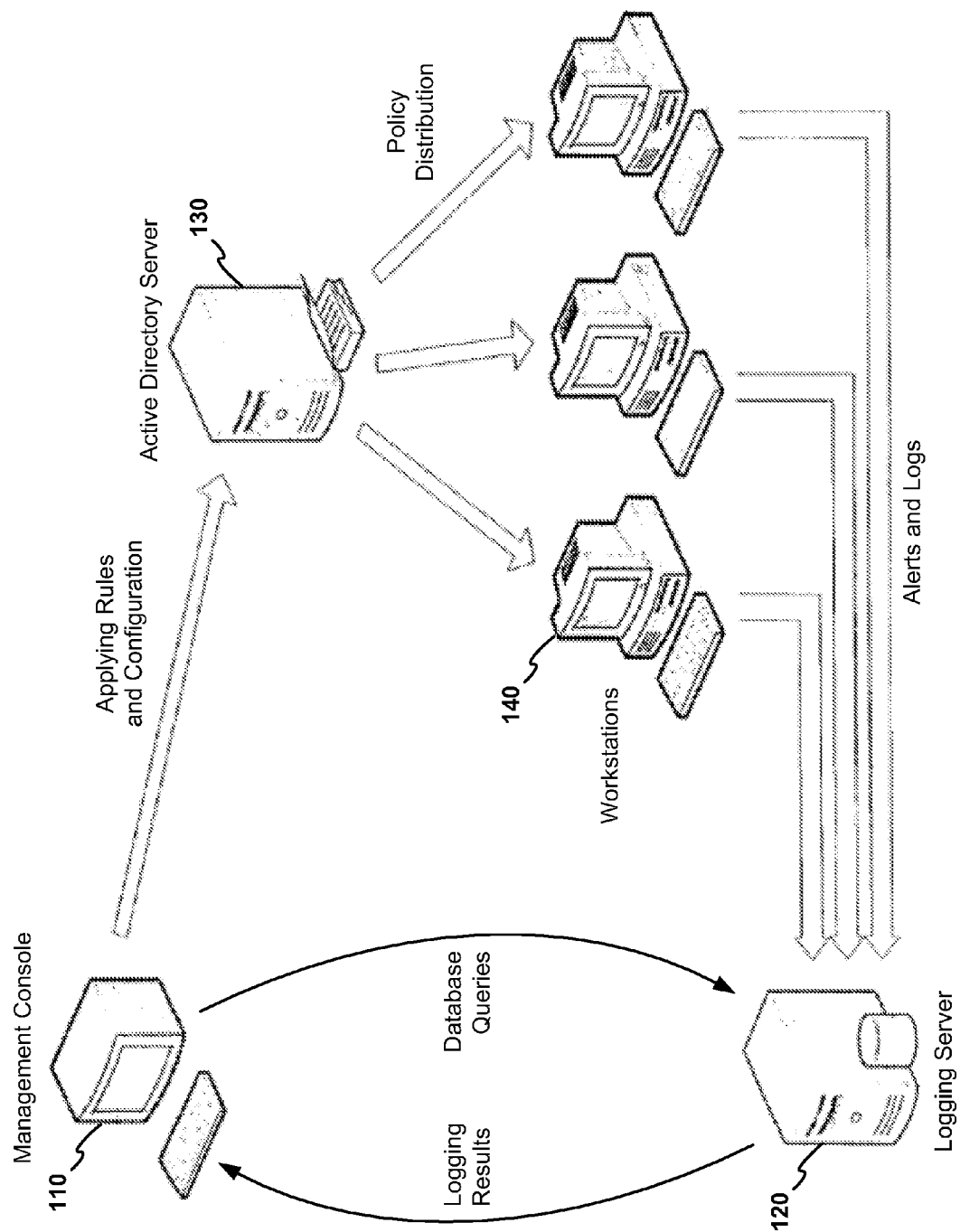
FIG. 1 is an overview of a typical system deployed in an organization's network, constructed in accordance with the principles of the present invention.

Accordingly, it is a principal object of the present invention to provide a method and system that addresses the problems of comparing the content of the transmitted time against a global database of all sensitive documents.

It is one more principal object of the present invention to provide a method and system wherein an information asset stored in an encrypted format can be compared against the global database by attaching the content-meta-data to the encrypted container at the time the plaintext is transformed into the encrypted format.

It is one other principal object of the present invention to provide a method and system for attaching content meta-data to information assets in order to make this type of information available in real time.

It is another principal object of the present invention to provide a method and system for comprehensive protection against leakage of sensitive information assets from the enterprise.

It is still another object of the present invention to provide a method and system for protecting information sent from within the organization hosts to destinations outside the organization's boundaries, via physical devices such as printers, USB devices and via the communications network, such as email, HTTP and Instant Messengers.

A method is disclosed for implementing a rule-based policy for security of information Assets in an enterprise system. The system for implementing the method includes a plurality of computers, information assets stored as information containers on the plurality of computers, at least one Tag attached to the information containers as metadata and a Policy consisting of a plurality of Rules. The system also includes an agent installed on each of the plurality of computers, operative in a manner which enables it to perform the functions of the method. The functions include tracking the information assets as they are transmitted between different computers of the plurality of computers, tracking the information assets as they are transmitted between the information containers, tracking the information assets as they are modified to different representations tracking the information assets as they are transformed to different representations and preserving attachment of the at least one Tag to the information assets through the transmissions and transformations. The functions also include generating descriptions of events representing at least the transmissions and transformations applying said plurality of Rules of the Policy to the Event Descriptions to ascertain whether the Events comply with the Policy and Enforcing any Reactions prescribed by the plurality of Rules of the Policy in response to the Events. The system also includes a Logging Server for storing the Event Descriptions generated by the Agents and a Management Console for setting the Policy and reviewing the Event Descriptions.

The existence and validity of content meta-data is crucial for the operation of the present invention. However, the operating system and application software may not be aware of the presence of such meta-data. As a result, this meta-data may not be preserved upon transmission and transformation of information assets. Consequently, the present invention contains a component for tracking host activities and preserving content-meta-data upon transmissions and transformations of information assets.

The present invention relates to the field of Host-based Information Leakage Detection and Prevention Systems (HILDP). The primary distinguishing feature from prior art information leakage prevention systems is association of meta-data to information assets and preservation of such meta-data through transmission and transformation of information assets.

A typical usage scenario of the present invention includes the following steps:
1. A System Administrator sets content meta-data types (Tags) along with Tagging Rules, which categorize and tag information assets (for example, tag all files residing in a certain server as 'Finance Files'), as well as tag any specific file of choice.

2. The administrator then sets Reaction Rules, which define which scenarios trigger events (For example, emailing of contents from 'Finance Files' should be blocked).
3. The policy including its rules propagates to the workstation (for example, via Active Directory).
4. According to tagging rules the Agent attaches content meta-data (tags) to files and other content structures.
5. The agent is responsible for maintaining the attachment of tags to transformations of contents as file copies, copy paste operations, etc.
6. Finally, upon triggering of Reaction Rules, the Agent Application can report the violation as well as block the transmission and/or dispatch an event to the logging server.

Content Tagging

The form of content meta-data used by the preferred embodiment is a set of Tags, where each tag represents a class of information assets of importance to the organization. For example, a 'Finance' tag may be attached to any confidential financial information. Information assets containing a mixture of data from multiple sources can be marked by a set of tags associated with these sources.

Where applicable, tags may be associated to pans of the information asset, rather than the entire information asset. In this case the form of meta-data is a mapping between tags and the ranges of text within the information asset associated to the tag. When insufficient information is available or when the information asset is not textual, the association is between a tag and the entire information asset.

Tagging of information can be done in several methods; however it should be preferably done in a manner that requires minimal manual involvement. The system uses any combination of the following methods to attach tags to information assets.
1. Tagging using recognition of textual patterns.
   The presence of a text pattern in an information asset, for example the word 'confidential', may be used as a trigger to attach a specific tag. Note that the subsequent removal of this text pattern shall not necessarily cause the removal of the tag (e.g. erasing the 'confidential' title from the document, should not effect its classification).
2. Location based tagging.
   Related documents are typically stored in the same folder or section of a server. This practice may be used to identify interesting information assets and tag them accordingly.
3. Tagging according to the generating application.
   Often business applications are used for a specific purpose implying that any document created by such application may be automatically categorized as containing a specific type of information. An example is all files created by computer-aided-design application may be tagged as 'Engineering' regardless of their location or other properties.
4. Manual tagging.
   If the above methods are not sufficient the system may allow designated users the ability to use their judgment and manually classify information assets by attaching tags.
5. Document discovery scanning.
   When the system is initially installed, the organization will typically have many documents requiring tagging, including multiple copies of the same documents scattered all over the organization. The system can apply a scanning procedure to identify substantially identical documents and apply the tags independently of the normal agent operation.

The tagging techniques (1-3) are performed by the agent in accordance with the definitions of tagging rules in the policy. These methods are initiated in response to user operations which are intercepted by the agent. These methods will be fully described later. The techniques (4-5) are external to the agent interception module and are scheduled by the user or administrator.

Storage of Content Meta-Data

Once the system identifies that an information asset should be associated with a set of tags, it must record this association in some form of persistent storage. Tag storage methods are strongly dependent on the underlying information container and therefore the system shall utilize a combination of methods for content meta-data storage in order to cope with tagging for a variety of information container types. The current embodiment uses the following methods for persistence of content-meta-data:
1. File extended attributes, where supported by the underlying file system;
2. File alternate data stream, where supported by the underlying file system;
3. Database storage of tag sets indexed by file name or by a hash function of the file content; where the underlying file system does not support any of the above methods;
4. Embedded in the information container, where the file format supports the addition of meta-data without disturbing the validity of the content;
5. In email message headers, for attaching content-meta-data to information assets incorporated into emails; and
6. Using Document attributes, when the information asset is stored in the database of a document management system.

Content-Tracking

Applications running in the host manipulate information containers. Some of these containers may have tags attached to them. These manipulations include low level operations such as deleting, reading and writing of information containers. The system tracks and analyzes these operations to infer higher lever events such as file copy, or transformation of data from one format to another. The purpose of the content tracking subsystem is to maintain the persistency of tag association to content throughout these low level operations. Note that the tracking mechanism is active as long as the system is installed, regardless of the agent policy. The actions performed by the content tracking subsystem are independent of any other operations the agent may apply according to its policy.

If the low level operation is a deletion of an information container, the system can allow this operation to proceed without interference. If the meta-data storage technique uses separate storage the system may need to update the database to reflect the deletion of the information asset. When the meta-data is attached to the container, no involvement is necessary.

If the low level operation is a reading operation, the content tracking subsystem reads the content of the information container and the associated meta-data. This information is not used immediately but is stored in an internal database for future reference.

If the low level operation is a write operation, the content tracking subsystem reads the written content and compares it against its internal database. If the written container contains content substantially identical to content previously read, the tags associated with the matching content are attached to the newly written container. If the output is textual, then the tag is associated to specific text ranges in the written container.

Some file formats may require special treatment. For example archive formats capable of containing other information containers. When these containers are processed, the same process must be applied recursively on all of their embedded containers. Another special case is encrypted formats, in which the content can not be determined by the system and therefore it shall apply a pessimistic approach, assuming all content read by the process creating the encrypted container is written to it. Consequently all the tags associated with the read data are associated with the encrypted file. The same treatment may be applied to file formats which are not encrypted but the system can not read their contents because of technical limitations.

Designated applications specified by the system administrator may be ignored by the content tracking subsystem. The ignore list should include applications with known behavior that can not result with information leakage. Ignoring these applications conserves system resources.

Designated documents specified by the system administrator may be ignored by the content tracking subsystem. Content from these documents is excluded from processing by the content comparison process.

The internal database need not be preserved after system restart. The content of the computer's volatile memory is erased on restart, and therefore the potential set of information assets from which content may have originated is limited by the set of information assets read within the same session.

Policy Enforcement

The purpose of the tagging and content tracking mechanisms is to make the content meta-data available to the agent when K needs to apply the security policy. The policy consists of a set of rules, namely tagging and reaction rules. The set of tagging rules is used for identifying sensitive information and performing tagging operations. Reaction rules are used to define the set of operations the agent should apply in case of unauthorized operations. A Reaction Rule consists of a condition and a set of actions. The condition is a Boolean function of the parameters of the event description. The actions are a subset of the following set of possible actions:

1. Monitor the operation and log it to the system event log;
2. Block the attempted operation and prevent it from completing successfully;
3. Notify the user that the operation was monitored or blocked;
4. Store a copy of information assets being transmitted to a dedicated storage;
5. Store an image of the screen at the time of the event as evidence;
6. Allow the operation to continue but set the system Access Control List associated with the information container to allow access only to designated users or groups; and
7. Allow the operation to continue but store the information asset in encrypted format to allow access only to designated users or groups having the corresponding key.

The parameters of the event description which may be referenced by the condition are:

1. The user performing the operation;
2. The workstation on which the operation is being performed;
3. The application performing the operation on behalf of the user;
4. The set of tags associated with the content being transmitted;
5. The file type or file extension of the content being transmitted; and
6. The destination to which the information is being transmitted.

The system administrator deploys the policy to all the installed agents in the organization through deployment means described below.

The method of the invention may be implemented and distributed using computer-readable media such as diskettes, CD-ROMS, disk-on-keys, or other memory devices for saving and using software.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

FIG. 1 is an overview of a typical system deployed in an organization's network, constructed in accordance with the principles of the present invention. The management console 110 is a software component typically installed on the administrator's workstation and is used to define the organization's security policy. Management console 110 interfaces with the organization's directory server 130 in order to deploy the policy to the workstations 140. This embodiment uses Microsoft's Active Directory server and Group Policy infrastructure, but alternative means of deployment may be used. Management console 110 also interfaces with the logging server 120 in order to supply means of viewing and analyzing collected events and alerts.

The agent software is installed on some or all of the organization's workstations 140 used by the end users. The agent software receives a copy of the system policy from the directory server via the policy distribution mechanism provided by the hosting operating system (e.g. Microsoft Group Policy). Once the agent retrieves the system policy it begins enforcing it. If a workstation 140 is temporarily disconnected from the network it will continue to enforce the last valid received policy. When an event is processed by the agent software, the policy may indicate that the event should be recorded. In this case the agent software will send the event to logging server 120. If workstation 140 is disconnected from the network, the agent will store the event in a local queue and transmit it as soon as workstation 140 is reconnected.

Figure 2A:
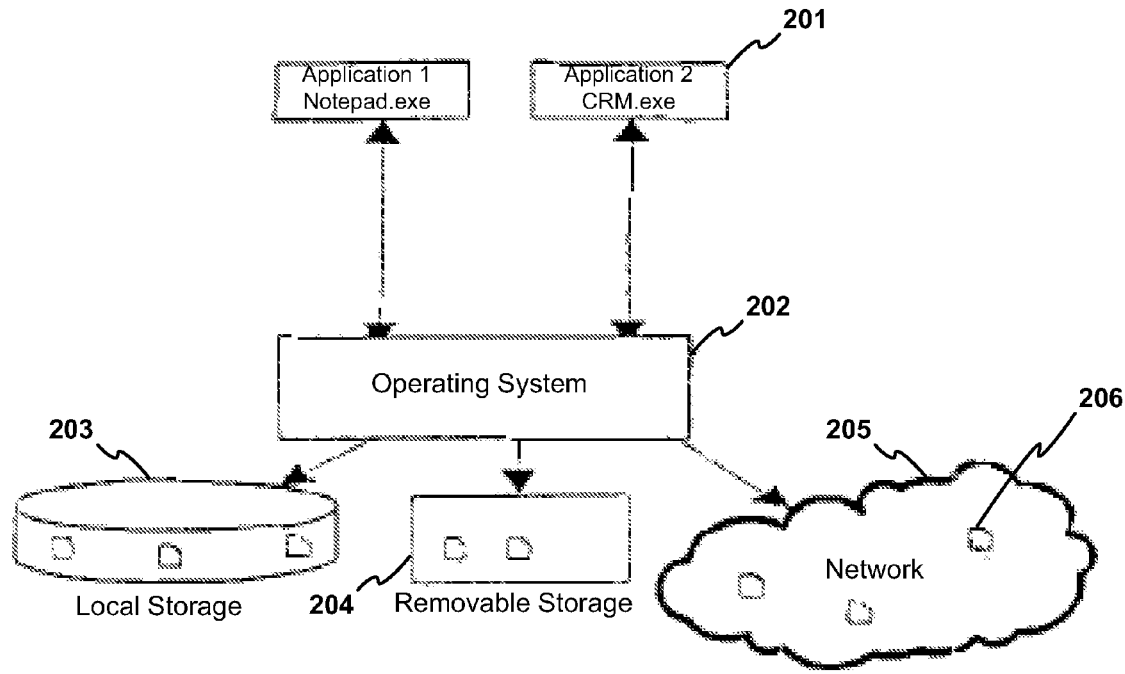
FIG. 2a illustrates a typical scenario of an application accessing an information asset constructed in accordance with the principles of the present invention.

FIG. 2a illustrates a typical system block diagram of an application 201 accessing an information asset 206, constructed in accordance with the principles of the present invention. This operation is mediated by the operating system 202. Information assets 206 may reside in the local file system 203, the removable storage 204 or on a network server 205.

Figure 2B:
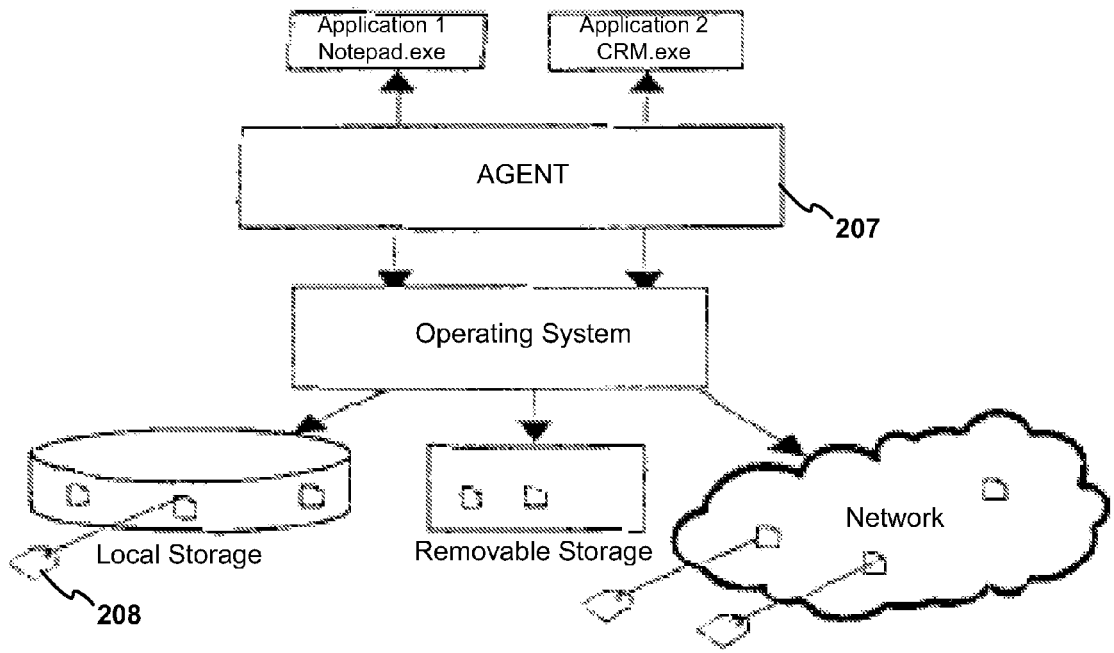
FIG. 2b shows the scenario of FIG. 2a with the agent software installed on the workstation, constructed in accordance with the principles of the present invention.

FIG. 2b shows the system block diagram of FIG. 2a with the agent software installed 207 on the workstation. Agent software 207 intercepts the application's request to the operating system for tracking and policy resolution purposes. Some of the information assets may have tags 208 attached to them. As long as there is no violation of policy the user will not be able to distinguish between the two scenarios shown in FIG. 2a and 2b, and should not be aware of the presence of agent software 207 or tags 208.

Figure 3:
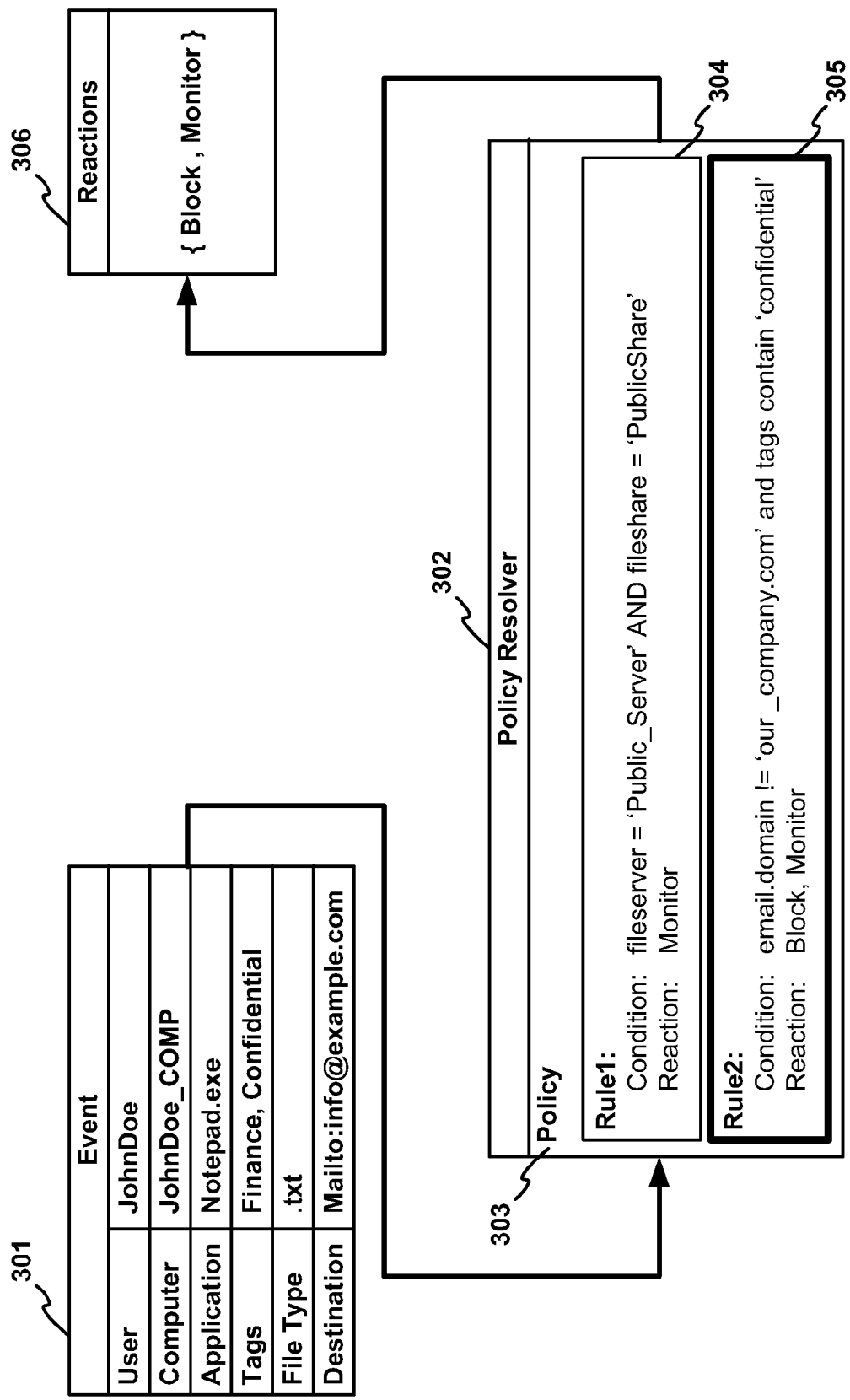
FIG. 3 is a conceptual block diagram of the policy resolution process, performed in accordance with the principles of the present invention.

FIG. 3 is a conceptual block diagram of the policy resolution process, performed in accordance with the principles of the present invention. The description of an event 301, containing the details of an attempted transmission intercepted by the agent, is sent to the policy resolver subcomponent 302. Policy resolver subcomponent 302 consults the current effective policy 303 to produce the appropriate set of reactions 306 the agent should take. Current policy 303 consists of a list of reaction rules 304, 305. Each rule consists of a condition and a set of reactions. Policy resolver 302 evaluates the condition of each reaction rule 304, 305 with the parameters from the details of event 301. If a condition evaluates to TRUE, then the set of reactions in the reaction rule is added to the set of reactions for this event 301. Effectively, policy resolution 302 is a function mapping an event description 301 to a set of reaction rules 304, 305.

Figure 4:
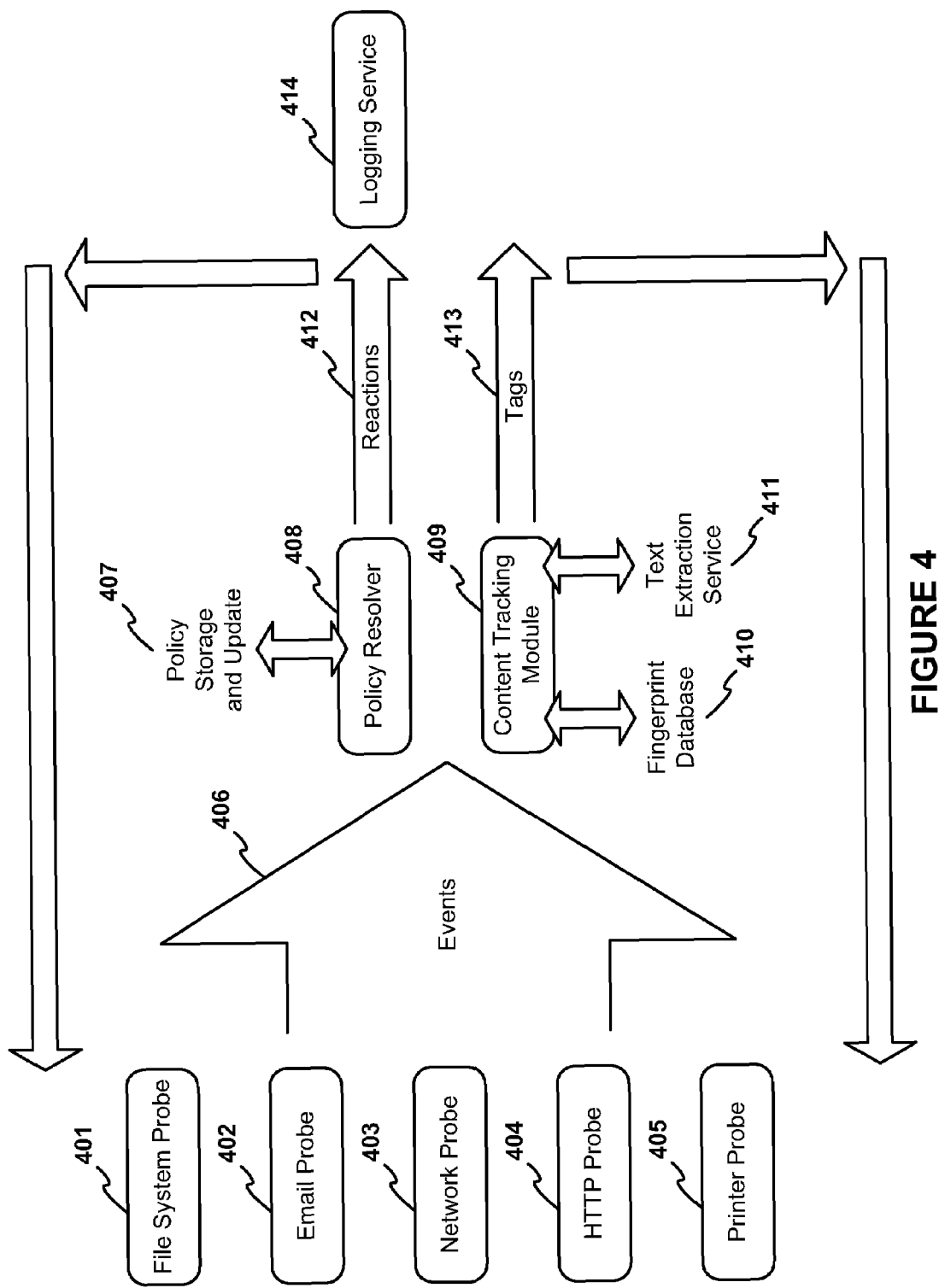
FIG. 4 is a diagram of the components of the agent software, constructed in accordance with the principles of the present invention.

The event description 301 comprises the following parameters:

The application making the request;

The identity of the user currently controlling the computer, as determined by his system authentication credentials;

The identity of the computer on which the application is running;

The type or resource accessed, e.g. file, network connection, clipboard;

Additional information about the resource, e.g. file storage location and address of remote side of network connection; and The tags associated with the information being transmitted FIG. 4 is a diagram of the components of the agent software 207 of FIG. 2b, constructed in accordance with the principles of the present invention. The file-system probe 401 intercepts requests by application software to files stored on local, removable or network file systems. In an exemplary embodiment, it is implemented as a driver conforming to the kernel mode file system filter driver model of the Windows NT kernel. The email probe 402 intercepts received emails and attempts to send email. In this embodiment it is implemented as a plug-in conforming to the plug-in interface of the Microsoft Outlook email program.

The network probe 403 intercepts requests to establish network connections using the TCP/IP protocol. It is implemented in the form of a kernel mode Transport Data Interface (TDI) filter driver for the Windows NT kernel. The HTTP probe 404 intercepts requests in the HTTP protocol. In this embodiment it is implemented in the form of a plug-in conforming to the plug-in interface of Microsoft Internet Explorer. The printer probe 405 intercepts printing requests.

In the current embodiment it is implemented by replacing the printing dynamic link library of the operating system with an alternative library, having a compatible interface. Any API requests intercepted by the alternative library are reported to the agent and according to the agents policy are either forwarded to the original library or reported to the calling application as unsuccessful (blocked).

All probes format the gathered information into a common representation of an event description and send the events 406 to the policy resolver 408. Policy resolver 408 applies the current policy to the event and calculates the set of reactions 412 to be performed in conjunction with the policy storage and update module 407. If the reaction set includes logging (Monitor), the event description along with the reaction set is sent to the logging service module 414. If the reaction set includes Block, this information is fed back into the original reporting probe, which is responsible to cause the original application request to fail.

The content tracking module 409 receives the low level events from the probes, and according to the event type (read, write, delete) consults with the fingerprinting database 410 and text extraction service 411 in order to maintain the attachment of tags according to the undergoing transmission. Content tracking module 409 may attach new tags 413 to the accessed information asset according to the policy tagging rules. Tag set 413 to be attached is fed back to the original reporting probe, which is responsible for storing them into the information asset using the method appropriate for the type of the information container, if applicable. This process will be described shortly in details.

Network traffic which is not intercepted by the email or HTTP probes is handled by network probe 403. Network probe 403 may intercept network connections by applications using unknown or unsupported protocols. In this case the content of the transmission is not available for inspection. The system makes the worst case assumption that the transmission contains the set of all tags attached to information containers previously accessed by the same process opening the network connection.

An event describing such a potential transmission of information is triggered either when an application opens a network connection after having accessed tagged information assets or when a tagged information asset is accessed by a process having an active network connection. A Block reaction to this type of event may be enforced by closing the network connection, preventing its establishment or by preventing access to the information asset.

Figure 5:
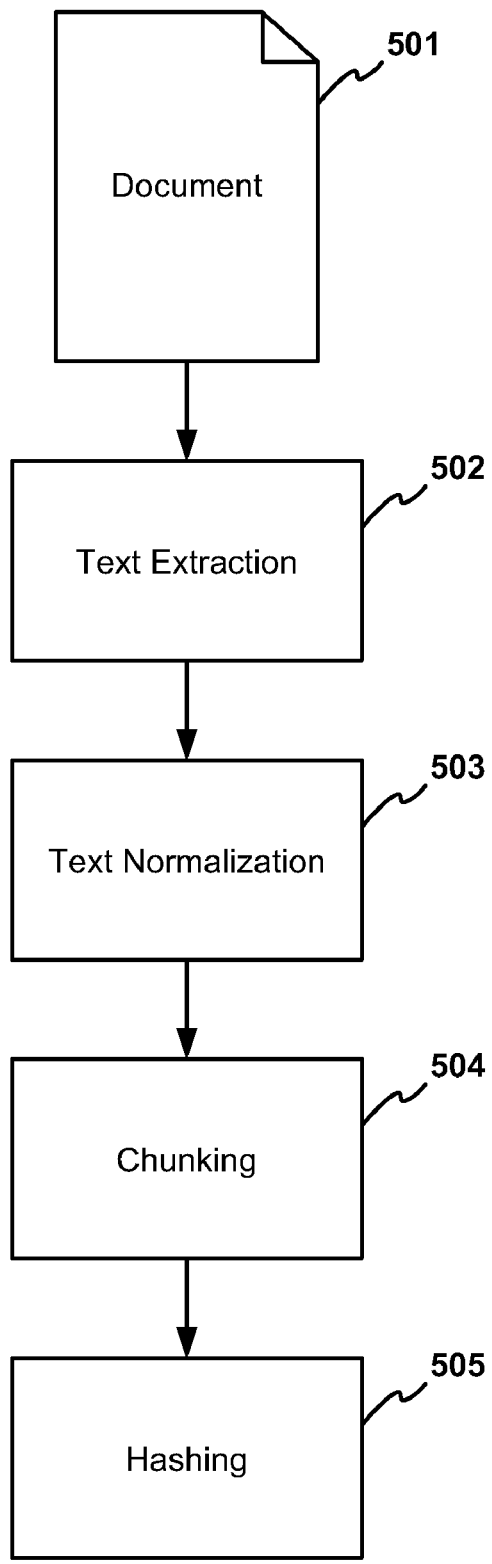
FIG. 5 illustrates the process of signature extraction, performed in accordance with the principles of the present invention.

FIG. 5 illustrates the process of signature extraction, performed in accordance with the principles of the present invention. This process is used by the content tracking module for an efficient implementation for comparison of text against a database of previously processed text. The input to the process is an information asset, and the output is a set of compact fingerprints representing the contents of the information asset. The original document 501 is fed into the text extractor module 502. Text extractor module 502 is capable of identifying a large number of file formats used for storing textual content, and extracting the textual parts of the document. Several off-the-shelf implementations of this functionality are available and are typically used by indexing and search engines.

Certain applications may make superficial changes to the text such as changing spacing and punctuation, formatting or typographical conventions. This may cause text comparison to fail even when the compared documents contain significantly similar text. The purpose of the text normalization step 503 is to remove such changes and help identify the text correctly. A suitable algorithm is described in the following Unicode technical reports TR15—unicode normalization forms TR29—text boundaries TR30—character foldings The chunking process 504 takes as input a sequence of normalized characters and breaks it down into a number of "chunks." A suitable algorithm for the chunking process is described in the article "Copy detection mechanisms for digital documents"—S Brin, J Davis, H Garcia-Molina. Proceedings of the 1995 ACM SIGMOD international conference.

The hashing step 505 calculates a fingerprint of each chunk using a low probability of collision hash function (e.g. SHA-1). The resulting set of fingerprints is a compact representation of the textual contents of the document. Two documents containing matching section of lengths exceeding some predefined threshold will contain overlapping fingerprints.

Figure 6:
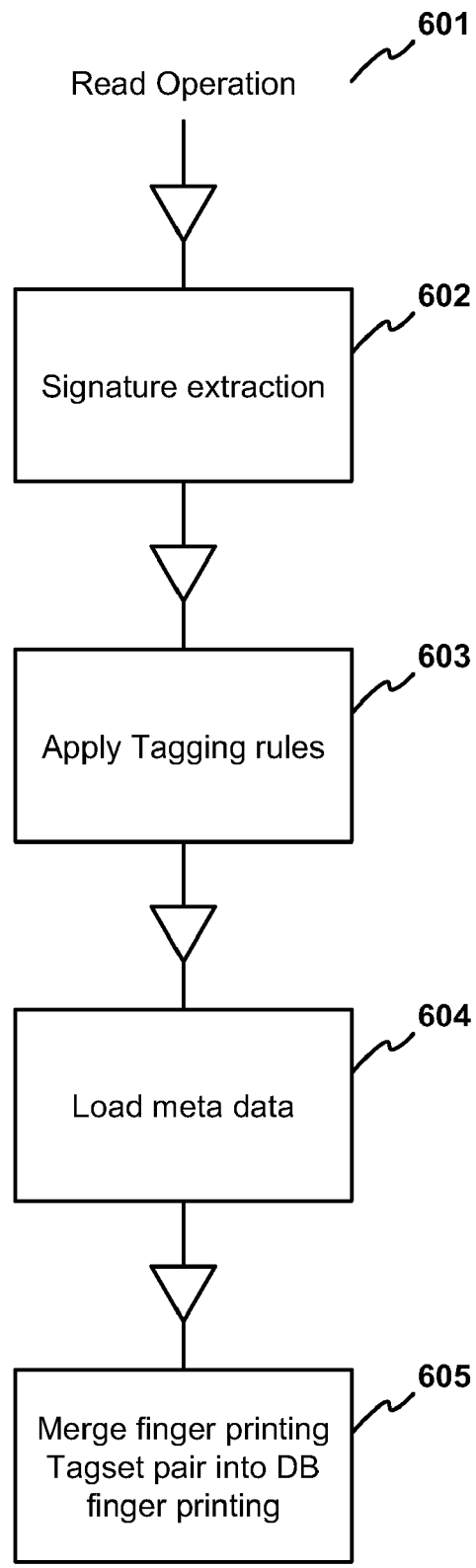
FIG. 6 illustrates the process performed by the content tracking module in response to an application request to read an information asset, performed in accordance with the principles of the present invention.

FIG. 6 illustrates the process performed by the content tracking module in response to an application request to read an information asset 601, performed in accordance with the principles of the present invention. The first step is signature extraction 602 as shown in FIG. 5. Next, the policy tagging rules 603 are evaluated to determine if new tags should be attached to the information asset. If so, the newly attached tags are associated with all fingerprints extracted in the signature extraction step. If the information asset has attached tags (either previously existing or as the result of applying the tagging rules), the tag meta data are loaded 604 into memory and associated with the corresponding chunks. Any fingerprints associated with tags are merged 605 into the fingerprint database. Merging implies either inserting a new fingerprint into the database, if it does not already exist, or updating the tag set associated with the fingerprint as the union of the existing tag and new sets of tags.

Figure 7:
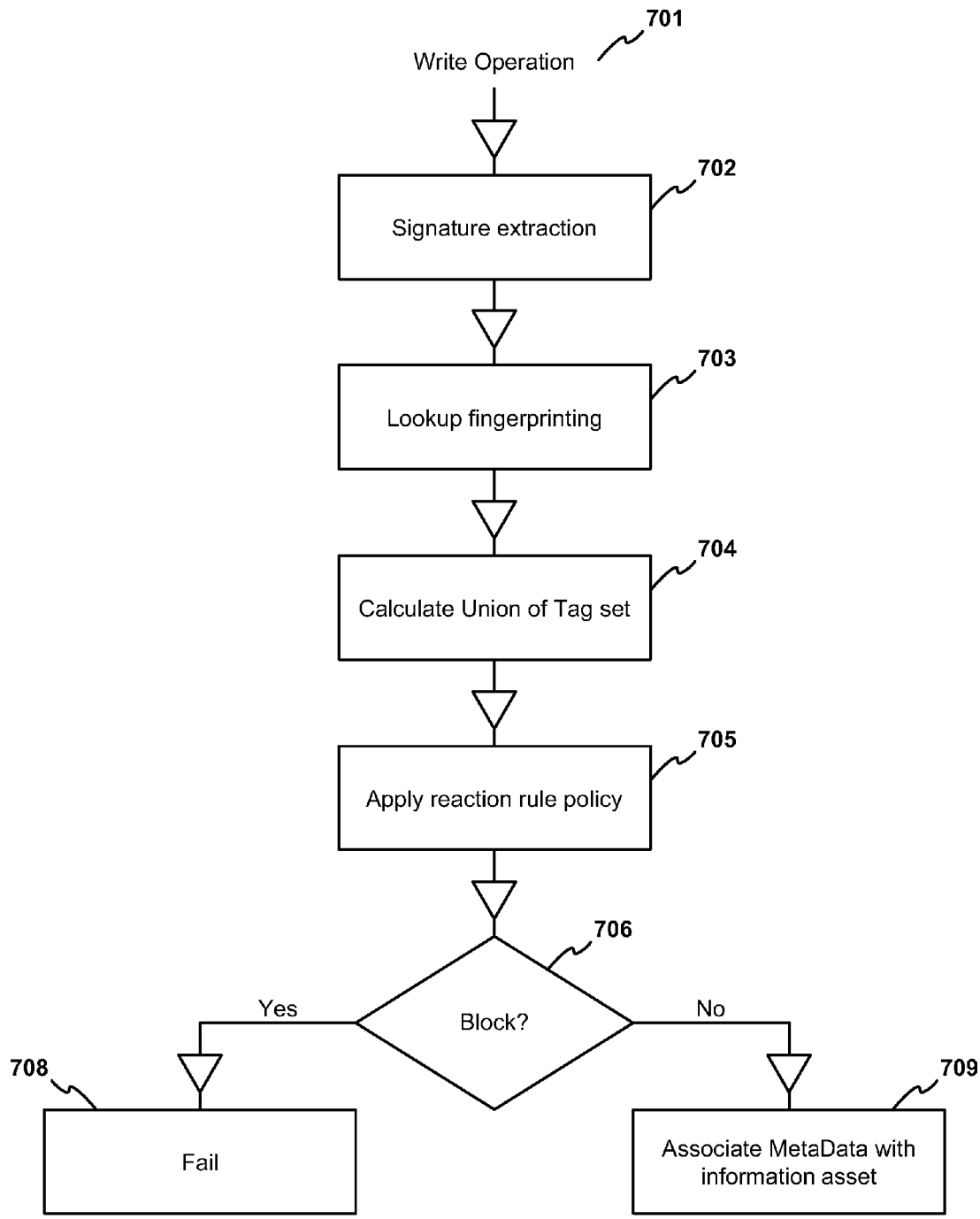
FIG. 7 illustrates the process performed by the content tracking module in response to an application request to write an information asset, performed in accordance with the principles of the present invention.

FIG. 7 illustrates the process performed by the content tracking module in response to an application request to write an information asset 701, performed in accordance with the principles of the present invention. Upon interception of such request, the agent performs signature extraction of the written document 702, looks up the extracted fingerprints in the fingerprint database 703 and calculates the union of tags associated with all matching fingerprints 704. This set is used as a parameter in the event description fed to the policy resolver when applying the reaction rules 705.

If the result of applying the reaction rules indicates that the operation is to be blocked 706, the original intercepting probe returns a failure result to the application 708. If the operation is allowed to continue the content tracking module associates the tags identified in 704 with the written information asset 709. If the written information assets is non textual, the tag set is associated with the entire information asset. For textual information assets a more selective process is applied where each tag is associated with specific text segments of the document as described below in FIG. 8.

Figure 8:
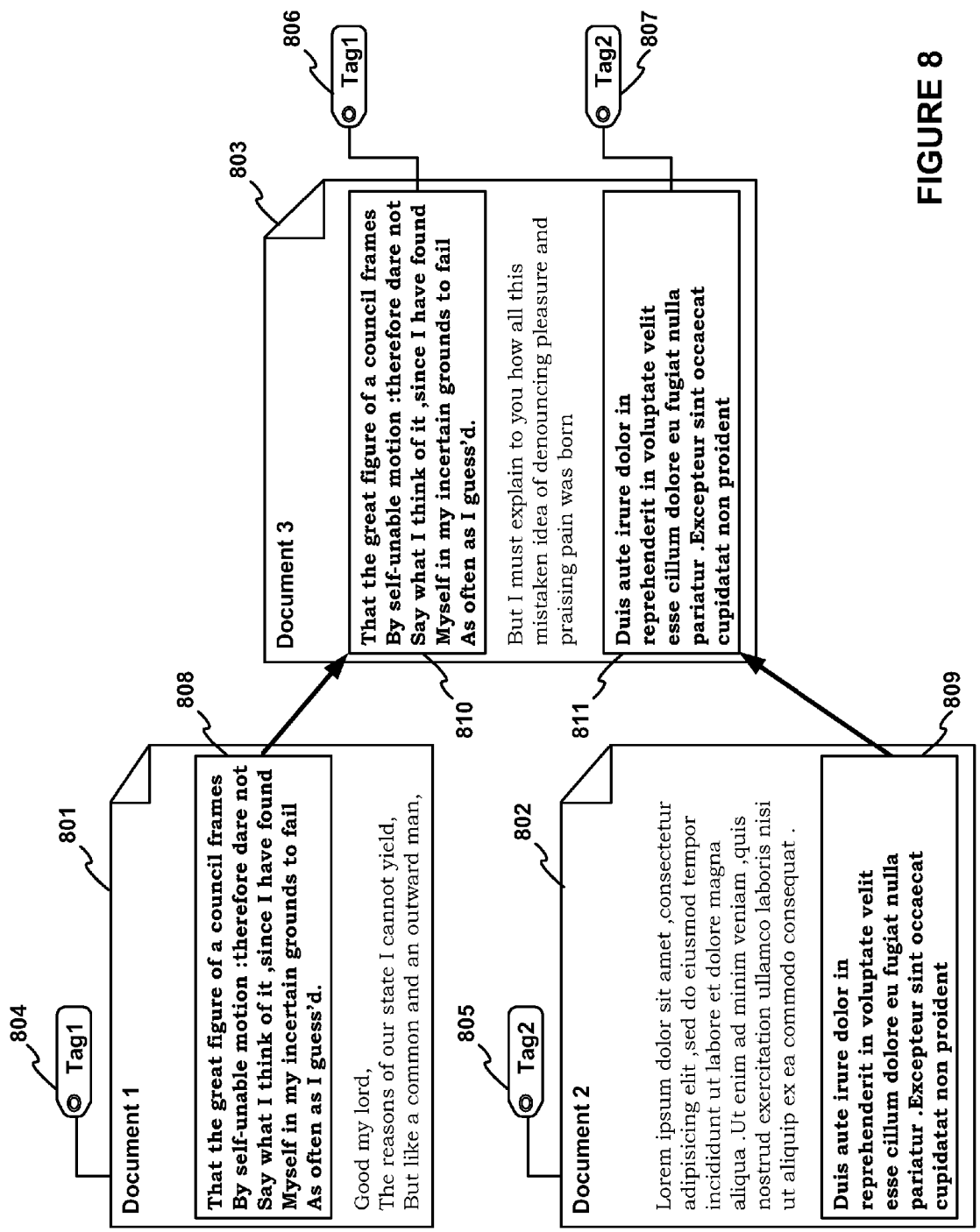
FIG. 8 illustrates a scenario in which a user creates a new document containing excerpts from two existing documents tagged respectively with tags Tag1 and Tag2, performed in accordance with the principles of the present invention.

FIG. 8 illustrates a scenario in which a user creates a new document 803 containing excerpts 808, 809 from two existing documents 801, 802 tagged respectively with tags Tag1 804 and Tag2 805, performed in accordance with the principles of the present invention. The user may, for example, copy these excerpts from the original documents via the system clipboard. Note that Tag1 804 and Tag2 805 are associated with the entire source documents 801, 802.

This is the normal situation resulting from initial tagging via tagging rules or other initial tagging methods. As a result of the content tracking process the new document is also tagged with instances of Tag1 806 and Tag2 807. Note that in the new document the tags are associated only with the specific text excerpts which are copied from the source documents, not with the entire document. The boundaries of the identified text range may be an approximation of the actual copied text range, as they are rounded by the chunking algorithm to the next neighboring chunk.

Figure 9:
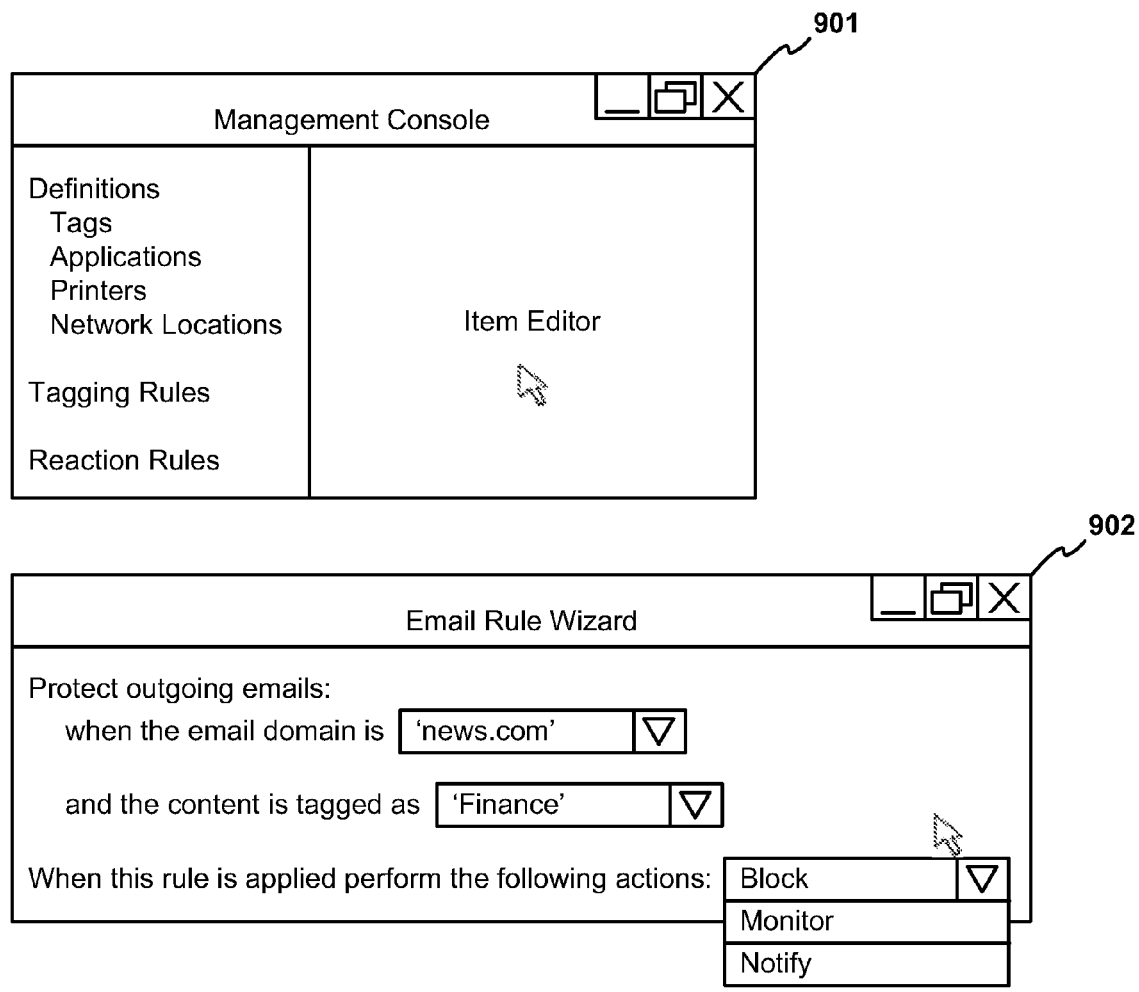
FIG. 9 illustrates an exemplary user interface of the management console used by the system administrator to create and edit the system policy, constructed in accordance with the principles of the present invention.

FIG. 9 illustrates an exemplary user interface of the management console used by the system administrator to create and edit the system policy, constructed in accordance with the principles of the present invention. The main screen in the management console 901 allows the user to select among a list of items which may be edited and defined. Among these items are Tagging rule, Reaction rules, and parameter values referenced by the rules such as Applications, Tag definitions, Specific sources/destinations such as file servers, printers and network address ranges.

Each element in the policy can be edited by a dedicated wizard user interface component 902. In an exemplary embodiment a wizard for editing an email reaction rule is described, allowing the administrator to configure a rule by specifying the email domain, the tags associated with potential transmission attempt and the required reaction. This user friendly representation of the rule is subsequently converted into a machine-readable condition embedded into the policy as described above with reference to FIG. 3.

When the administrator completes editing the policy it may be deployed to the agents installed on the work stations via the system directory server 130 as shown in FIG. 1 above.

Management console 901 may also supply either a monitoring system that allows the administrator to view recent events. The monitoring system may be incorporated as part of management console 901 or as a stand alone application.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A computer-implemented method, comprising:
    tracking at least one operation performed on an information asset, the information asset having metadata associated therewith, the at least one operation including a transformation of the information asset to a different representation;
    generating descriptions of events each representing at least one of a transmission of the information asset and the transformation; and
    enforcing a reaction prescribed by the plurality of rules of a policy in response to the events, including storing the descriptions of the events in a logging server and analyzing the descriptions of the events utilizing the management console;
    wherein the metadata is preserved during the at least one operation;
    wherein an agent is installed on a computer for performing the tracking, the generating of the descriptions of the events, and the enforcing of the reaction.

2. The method as recited in claim 1, wherein the information asset includes a file.

3. The method as recited in claim 1, wherein the operation includes a change made to the information asset.

4. The method as recited in claim 3, wherein the change includes encrypting the information asset.

5. The method as recited in claim 1, wherein the operation includes the transmission of the information asset, the transmission being between a plurality of computers.

6. The method as recited in claim 1, wherein the operation includes the transmission of the information asset, the transmission being between a plurality of information containers.

7. The method as recited in claim 1, and further comprising generating the events associated with the operation.

8. The method as recited in claim 7, wherein the events describe the operation.

9. The method as recited in claim 7, and further comprising applying the policy to the generated events.

10. The method as recited in claim 9, and further comprising initiating an action if at least one of the generated events violates the policy.

11. The method as recited in claim 1, wherein the metadata is associated with at least a portion of contents of the information asset.

12. The method as recited in claim 1, wherein a plurality of instances of metadata are each associated with a different portion of contents of the information asset.

13. The method as recited in claim 1, wherein the metadata represents a confidentiality status of the information asset.

14. The method as recited in claim 1, wherein the metadata represents at least one attribute of the information asset.

15. The method as recited in claim 1, wherein the metadata is stored as at least one of an extended attribute of the information asset, an alternate data stream of the information asset, data in a database indexed by a name of the information asset, data in a database indexed by a hash function of contents of the information asset, data embedded within the information asset, and a header of the information asset.

16. The method as recited in claim 1, wherein the metadata is automatically associated with the information asset.

17. The method as recited in claim 16, wherein the metadata is automatically associated with the information asset based on a creation of the information asset.

18. The method as recited in claim 1, wherein the metadata associated with the information asset is based on at least one of a source of the information asset and an application that created the information asset.

19. A computer program product embodied on a tangible computer readable medium, comprising:
    computer code for tracking at least one operation performed on an information asset, the information asset having metadata associated therewith, the at least one operation including a transformation of the information asset to a different representation;
    computer code for generating descriptions of events each representing at least one of a transmission of the information asset and the transformation; and
    computer code for enforcing a reaction prescribed by the plurality of rules of a policy in response to the events, including storing the descriptions of the events in a logging server and analyzing the descriptions of the events utilizing the management console;
    wherein the computer program product is operable such that the metadata is preserved during the at least one operation;
    wherein the computer program product is operable such that an agent is installed on a computer for performing the tracking, the generating of the descriptions of the events, and the enforcing of the reaction.

20. A data structure embodied on a computer readable medium, Comprising:
    metadata associated with an information asset that is preserved during at least one of a change and a transmission of the information asset, the change including a transformation of the information asset to a different representation;
    wherein the data structure is utilized such that descriptions of events each representing at least one of a transmission of the information asset and the transformation are generated;
    wherein the data structure is utilized such that a reaction prescribed by the plurality of rules of a policy is enforced in response to the events, including storing the descriptions of the events in a logging server and analyzing the descriptions of the events utilizing the management console;
    wherein the data structure is utilized such that an agent is installed on a computer for performing the tracking, the generating of the descriptions of the events, and the enforcing of the reaction.

21. A method for implementing a rule-based policy for security of information assets in an enterprise system comprising a plurality of computers, comprising:
    tracking transmission of an information asset between a plurality of computers, the information asset stored as an information container and having a tag in the form of metadata attached thereto;
    tracking transmission of the information asset between a plurality of information containers;
    tracking modification of the information asset to a different representation;
    tracking transformation of the information asset to different a representation;
    preserving attachment of the tag to the information asset during the transmission and the transformation;
    generating descriptions of events each representing at least one of the transmission and the transformation;
    applying a policy including a plurality of rules to the descriptions of the events for determining whether the events comply with the policy, where the policy is configured by a management console; and
    enforcing a reaction prescribed by the plurality of rules of the policy in response to the events, including storing the descriptions of the events in a logging server and analyzing the descriptions of the events utilizing the management console;
    wherein an agent is installed on each of the plurality of computers for performing the tracking, the generating of the descriptions of the events, the applying the policy to the descriptions of the events, and the enforcing of the reaction.

* * * * *